(12) United States Patent
Pietsch et al.

(10) Patent No.: US 7,885,722 B2
(45) Date of Patent: Feb. 8, 2011

(54) METHOD PLANNING FOR MANUFACTURING SHEET-METAL FORMING PARTS

(75) Inventors: Matthias Pietsch, Zunich (CH); Silke Wagner, Zurich (CH); Nicolas Lefebvre, Zurich (CH); Waldemar Kubli, Neerach (CH)

(73) Assignee: Autoform Engineering GmbH, Neerach (CH)

( * ) Notice: Subject to any disclaimer, the term of this patent is extended or adjusted under 35 U.S.C. 154(b) by 823 days.

(21) Appl. No.: 11/688,545

(22) Filed: Mar. 20, 2007

(65) Prior Publication Data

US 2007/0225847 A1 Sep. 27, 2007

(30) Foreign Application Priority Data

Mar. 23, 2006 (CH) .................................. 0451/06

(51) Int. Cl.
*G06F 19/00* (2006.01)
*G06G 7/48* (2006.01)

(52) U.S. Cl. .................... 700/98; 700/103; 700/182; 703/7

(58) Field of Classification Search ............ 700/97, 700/98, 103, 104, 145, 159, 175, 180, 181, 700/182; 703/1, 6, 7; 705/26
See application file for complete search history.

(56) References Cited

U.S. PATENT DOCUMENTS

| | | | | |
|---|---|---|---|---|
| 5,377,116 A * | 12/1994 | Wayne et al. | ............. | 700/175 |
| 5,914,889 A * | 6/1999 | Cohen et al. | ............. | 716/8 |
| 6,233,538 B1 * | 5/2001 | Gupta et al. | ............. | 703/6 |
| 6,295,513 B1 * | 9/2001 | Thackston | ............. | 703/1 |
| 6,434,441 B1 * | 8/2002 | Beauchamp et al. | ............. | 700/98 |
| 6,662,071 B1 * | 12/2003 | Jackson et al. | ............. | 700/159 |
| 6,795,749 B2 * | 9/2004 | Suh et al. | ............. | 700/181 |
| 6,856,842 B2 * | 2/2005 | Rebello et al. | ............. | 700/31 |
| 7,337,093 B2 * | 2/2008 | Ramani et al. | ............. | 703/1 |
| 7,398,129 B2 * | 7/2008 | Ishii et al. | ............. | 700/104 |
| 7,496,420 B2 * | 2/2009 | Red et al. | ............. | 700/98 |
| 7,751,917 B2 * | 7/2010 | Rees et al. | ............. | 700/97 |
| 7,755,623 B2 * | 7/2010 | Rockwood et al. | ............. | 345/420 |
| 7,778,995 B2 * | 8/2010 | Qamhiyah et al. | ............. | 707/706 |
| 2006/0129462 A1 * | 6/2006 | Pankl et al. | ............. | 705/26 |

FOREIGN PATENT DOCUMENTS

| | | |
|---|---|---|
| WO | 2004001514 | 12/2003 |
| WO | 2004/102291 | 11/2004 |
| WO | 2005/024671 | 3/2005 |
| WO | 2005/103850 | 11/2005 |

* cited by examiner

*Primary Examiner*—Crystal J Barnes-Bullock
(74) *Attorney, Agent, or Firm*—Rankin, Hill & Clark LLP

(57) ABSTRACT

A method for computer-aided generation of tool parameters for tools for the manufacture of sheet-metal forming parts by way of forming processes, including the following steps:
 determining a set of geometry features (11, 12, 13, 14, 15) of a part (10) in a geometry model of the part (10);
 determining an associated method standard for each of the geometry features (11, 12, 13, 14, 15), wherein a method standard comprises at least one module, and a module represents a processing unit and describes which processing unit may be executed within a forming operation;
 determining components for each of the modules of the method standard, wherein these components describe the parts of tools which are required for realising the module;
 determining component parameters from geometric parameters of the geometry features (11, 12, 13, 14, 15), wherein the component parameters comprise geometric parameters of the components or of the respective tools.

15 Claims, 6 Drawing Sheets

| feature type | method standard |
|---|---|
| round hole | holing |
| slot | holing |
| rectangular hole | holing |
| special hole | holing |
| round hole not Z | holing with cam |
| slot not Z | holing with cam |
| rectangular hole not Z | holing with cam |
| special hole not Z | holing with cam |
| large opening | precutting, drawing, segmented cutting, postforming |
| | precutting, drawing, segmented cutting, folding, postforming |
| | precutting, drawing, cutting, postforming |
| | precutting, drawing, postforming |
| | precutting, drawing |
| opening | cutting |
| opening not Z | cutting with cam |
| punching round | holing, punching |
| punching slot | holing, punching |
| punching rectangle | holing, punching |
| punching special | holing, punching |
| punching round not Z | holing with cam, punching with cam |
| | holing from Z, punching with cam |
| | holing from Z, punching from Z |
| punching slot not Z | holing with cam, punching with cam |
| | holing from Z, punching with cam |
| | holing from Z, punching from Z |
| punching rectangle not Z | holing with cam, punching with cam |
| | holing from Z, punching with cam |
| | holing from Z, punching from Z |
| punching special not Z | holing with cam, punching with cam |
| | holing from Z, punching with cam |
| | holing from Z, punching from Z |
| large punching | cutting, punching |
| large punching not Z | cutting with cam, punching with cam |
| | cutting from Z, punching with cam |
| simple flange | folding |
| | folding, cutting with cam |
| | postforming, cutting with cam |
| | folding, postforming mit FS |
| | folding, postforming mit FS, cutting with cam |

Fig. 4

| feature type | module | component type 1 | component type 1 | component type 3 | component type 4 |
|---|---|---|---|---|---|
| round hole | holing | cutting punch | retainer cutting unit | thrust plate cutting unit | stripper plate |
| slot | holing | cutting punch | retainer cutting unit | thrust plate cutting unit | stripper plate |
| rectangular hole | holing | cutting punch | retainer cutting unit | thrust plate cutting unit | stripper plate |
| special hole | holing | cutting punch | retainer cutting unit | thrust plate cutting unit | stripper plate |
| round hole not Z | holing with cam | cutting punch | retainer cutting unit | thrust plate cutting unit | stripper plate |
| slot not Z | holing with cam | cutting punch | retainer cutting unit | thrust plate cutting unit | stripper plate |
| rectangular hole not Z | holing with cam | cutting punch | retainer cutting unit | thrust plate cutting unit | stripper plate |
| special hole not Z | holing with cam | cutting punch | retainer cutting unit | thrust plate cutting unit | stripper plate |
| large opening | precutting | cutting knife | cutting knife | | |
| | drawing | inner-lying sheet metal holder | | | |
| | cutting | cutting die | retainer cutting unit | cutting punch | stripper plate |
| | cutting segments | upper knife segment | lower knife segment | | |
| | postforming, cutting with cam | active jaw | passive jaw | | |
| | folding | active jaw | passive jaw | | |
| opening | cutting | cutting die | retainer cutting unit | cutting punch | stripper plate |
| opening not Z | cutting with cam | cutting die | retainer cutting unit | cutting punch | stripper plate |
| punching round | holing | cutting punch | retainer cutting unit | thrust plate cutting unit | stripper plate |
| | punching | flanging jaw | retainer forming unit | thrust plate forming unit | receiver plate |
| punching slot | holing | cutting punch | retainer cutting unit | thrust plate cutting unit | stripper plate |
| | punching | flanging jaw | retainer forming unit | thrust plate forming unit | receiver plate |
| punching rectangle | holing | cutting punch | retainer cutting unit | thrust plate cutting unit | stripper plate |
| | punching | flanging jaw | retainer forming unit | thrust plate forming unit | receiver plate |
| punching special | holing | cutting punch | retainer cutting unit | thrust plate cutting unit | stripper plate |
| | punching | flanging jaw | retainer forming unit | thrust plate forming unit | receiver plate |
| punching round not z | holing from Z | cutting punch | retainer cutting unit | thrust plate cutting unit | stripper plate |
| | holing with cam | cutting punch | retainer cutting unit | thrust plate cutting unit | stripper plate |
| | punching with cam | flanging jaw | retainer forming unit | thrust plate forming unit | receiver plate |
| | punching from Z | flanging jaw | retainer forming unit | thrust plate forming unit | receiver plate |
| punching slot not Z | holing from Z | cutting punch | retainer cutting unit | thrust plate cutting unit | stripper plate |
| | holing with cam | cutting punch | retainer cutting unit | thrust plate cutting unit | stripper plate |
| | punching with cam | flanging jaw | retainer forming unit | thrust plate forming unit | receiver plate |
| | punching from Z | flanging jaw | retainer forming unit | thrust plate forming unit | receiver plate |

| component | unit | type | standard value | instantiation rule | rounding rule |
|---|---|---|---|---|---|
| hole punch round | | | | | |
| Radius | mm | double | | radius | ROUND |
| Length | mm | double | | (CD_PA_35 * 2*((CD_PA_35*CD_ | NO ROUND UP |
| CO_Material | | string | | HSS | |
| hole punch rectangular | | | | | |
| Length | mm | double | | cutting length | ROUND |
| Width | mm | double | | cutting width | ROUND |
| Height | mm | double | | 80 | |
| Material | | string | | HSS | |
| knife | | | | | |
| Length | mm | double | 350 | Length/2 | ROUND UP |
| Width | mm | double | | 75 + ceil(Length/225)*25 | ROUND UP |
| Height | mm | double | | 75 + ceil(Length/225)*25 | ROUND UP |
| Material | | enum | | M_05 | |
| jaw | | | | | |
| Length | mm | double | 350 | Length | ROUND UP |
| Width | mm | double | | 75 + ceil(Length/225)*25 | ROUND UP |
| Height | mm | double | | 75 + ceil(Length/225)*25 | ROUND UP |
| Material | | enum | | M_05 | |

51 — component column
52 — instantiation rule column
53 — rounding rule column

Fig. 7

| | | selection variables | | | | | further info | |
|---|---|---|---|---|---|---|---|---|
| | | radius [mm] | graduation | total length [mm] | | material | internal production | Norm |
| name | type | CO_Radius | Graduation CO_Radius | CO_Length | | CO_Material | | |
| cutting punch | hole punch round | [0.5, 0.95] | 0.1 | 71; 80 | | HWS | no | DIN 9861 |
| cutting punch | hole punch round | [1, 8.4] | 0.1 | 71; 80 | | HWS | no | DIN 9861 |
| cutting punch wit | hole punch round | [0.5, 1.4] | 0.1 | 63; 72; 80; 90; 100 | | HWS | no | DIN 9861 |
| cutting punch wit | hole punch round | [1.5, 2.9] | 0.1 | 63; 72; 80; 90; 100 | | HWS | no | DIN 9861 |

Fig. 8

| | | machining cost | | material consumption | | hardening | | |
|---|---|---|---|---|---|---|---|---|
| | | milling & drilling | final assembly | semifinished product | parts to be bought | annealing | hardening | laser hardening |
| name | type | PS_TL_05 | PS_TL_24 | | | H_01 | H_02 | H_03 |
| cutting punch | hole punch round | 0.25 | 0.15+0.1*CO_Radius | M_50 | 37.1+3.18*CO_Radius | | | |
| cutting punch | hole punch round | 0.2+0.147*CO_Radius | 0.2+0.1*CO_Radius | | 42.3+3.19*CO_Radius | | | |
| cutting punch wit | hole punch round | 0.25 | 0.15+0.1*CO_Radius | M_50 | 37.1+3.18*CO_Radius | | | |
| cutting punch wit | hole punch round | 0.2+0.147*CO_Radius | 0.2+0.1*CO_Radius | | 42.3+3.19*CO_Radius | | | |

METHOD PLANNING FOR MANUFACTURING SHEET-METAL FORMING PARTS

BACKGROUND OF THE INVENTION

1. Field of the Invention

The present invention lies in the field of determining and optimising machining steps for manufacturing sheet-metal forming parts, for example by way of deep-drawing and stretch-forming processes. It relates to a method, a data processing system, a computer program and a data carrier for the computer-aided generation of tool parameters for physical tools for manufacturing sheet-metal forming parts by way of forming processes, according to the respective independent patent claims.

2. Description of Related Art

Sheet-metal forming parts as a rule are manufactured by deep-drawing/stretch-forming. The semi-finished product, the so-called sheet metal billets (or just "billets"), for this purpose, is applied in multi-part forming tools. The parts are shaped by way of presses, in which the shaping tools are clamped. As a rule, the parts are manufactured from a flat sheet-metal billet over several forming stages by way of machining steps or manufacturing steps such as drawing, restriking, forming down, etc., combined with cutting steps.

With the development of the method plan, several forming operations and their contents, which is to say that which is shaped or cut in which operation, as well as descriptions of the physical tools which are required for the manufacture of this part, are determined. Thereby, one proceeds from the finished, constructed part, and nowadays, the procedure is usually as follows.

There are approaches with a differing degree of detailing:

The coarse method is often at the beginning of the planning process, for example in order to have a basis for the calculation of an offer. Here, the operational sequence is fixed, i.e. for each operation, one determines which part regions are machined in which manner. The "auxiliary conditions" such as e.g. the press, are usually not yet known at this point in time.

The fine method arises at a significantly later point in time than the coarse method. This turns out to be much more detailed than the coarse method, on account of the larger "information basis" which is then available. It, thus, comprises e.g. the exact sectional contour for the billet sections, particularities of the drawing operation (draw beads etc.), the pivot position in each operation, and precise working directions of the cams. It serves as an input for the tool design.

Until now, experience has played a large role with the manual production by a human method planner; the evaluation of the method is effected mostly be way of already created methods for parts of the same type, either indirectly by way of the re-use of the obtained knowledge, or directly by way of modifying an already existing method for a similar part. In the course of time, the method planner "learns":

with which sequences of machining steps one may realise certain part geometries, such as e.g. L-flanges or Z-flanges;

which "combination" of part regions and machining steps may be realized in an operation or should be preferably manufactured together in an operation (e.g. with a side wall, "the folding of the roof channel" and "folding the A-column at the top" may often be easily realized in one operation);

which "combination" of part regions and machining steps may not be realized or only poorly realized in one operation (e.g. with a side wall, the "postforming of the roof channel" and the "postforming of the A-column at the top" may often not be combined together in one operation, since there is not enough space for all cams).

As a rule, uses 2D-screenshots of the part for the visual representation of the coarse method, wherein the methods are then mostly set up with the help of simple guidelines, such as for example there is a picture for each operation there is a colour for each processing part (cutting, folding, . . . )

Then the part regions machined in the respective operation are marked with the respective colours. There are also variations with only one picture, in which each colour then corresponds to one operation.

This procedural manner on creating the coarse method entails many disadvantages:

The planner, with each new part, starts from "the very beginning" and constructs the method from scratch again; even when using old method plans, one needs to check for each step, as to whether it may be transferred to the new part or tool without further ado, and the method for the new part is created afresh by hand. This renders the procedure unnecessarily time-consuming and expensive.

Since the found solutions are based to a considerable extent on the experience of the respective planner, to some part they are very difficult to understand by other persons.

The comparability and re-usability of different solutions suffers from the different approach methods of the individual planners, and the absence of company-specific standards.

The insufficient use of 3D-geometry leads to avoidable inaccuracies and the method being prone to error because of this; it may occur that potential problem locations in the geometry are overlooked, and parameters are estimated which could also be computed in an accurate manner (such as e.g. the pivot position).

If no 3D-geometry is used, then there neither exists the possibility of securing the method plan via a simulation.

There are no standardised documents for the communication of the method to suppliers or to customers.

First, cost estimates for the tool investment costs and also offer calculations arise on the basis of the coarse method. Here too, the experience of the human calculator plays an important role, in particular with regard to the estimation of cost, which is why similar problems may be identified as with the creation of the coarse methods:

The calculations may not be reproduced; different calculators arrive at different results, and even the same calculator may arrive at two different results for one and the same tool, since the calculation is subject to his personal assessment.

The calculator begins "from scratch" with each cost calculation.

The poor comparability of the coarse methods, even in combination with the subjective assessment by the calculator, entails a high planning risk: it is not possible to assess and compare different methods and their costs according to objective yardsticks, in order to select the best one.

Often one may not even fall back on different (subjective) methods and their assessments as a planning aid, since the creation and calculation is much too time-consuming. In particular with regard to the suppliers who must provide an offer for one or also more sets of tools within a short time period, time is a very critical factor (partly the time is so limited that it is not even sufficient for the creation of a single method (according to the previous method); and the price offer is then, for example, ascertained by way of each planner or calculator mentioning a number which appears appropriate to him, and taking an average from this).

The calculation of the supplier is not adequately transparent to the client, and changes in the calculations as a rule are not understood.

For the calculation of an offer, it is too much effort to create a representation of the required machining steps and machining tools, which is much more detailed compared to the coarse method, or even create a complete method plan, and to estimate the costs from this.

BRIEF SUMMARY OF THE INVENTION

The following terms are used: parts are shaped by way of forming presses, which may also be indicated as a press line, and may comprise several individual stations or "individual presses". In the case of progressive dies, the individual stations are realized in one tool. The procedures in an individual station are indicated as an operation. From the point of view of the part, a feature is manufactured by a manufacturing sequence of individual manufacturing steps. Those manufacturing steps for a feature, which are carried out in the same station or operation, form a processing unit, hereinafter called "module".

It is the object of the invention, to provide a method, a data processing system, a computer program and a data carrier for computer-aided generation of tool parameters for tools for the manufacture of sheet-metal forming parts by way of forming processes of the initially mentioned type, which overcome the disadvantages specified above, and in particular permit a detailed representation of the manufacturing process to be generated.

This object is achieved according to the subject-matters of the respective independent claims.

The method for computer-aided generation of tool parameters for tools for the manufacture of sheet-metal forming parts by way of forming processes, wherein a representation of a manufacturing process is produced which comprises a set of processing steps or manufacturing steps and geometric parameters of these processing steps, comprises the following steps:

determining a set of geometry features (hereinafter also just called "features") of a part in a geometry model of the part, wherein each of the geometry features is described by a feature type and by way of geometric parameters for describing the geometric shape of the geometry feature;

determining an associated method standard for each of the geometry features, wherein a method standard describes one variant for manufacturing the respective geometry feature, the selection of the method standards which may be associated with a certain geometry feature is dependent on the feature type of the geometry feature, and wherein a method standard comprises at least one module, and a module represents a machining unit and describes which machining unit may be implemented within a forming operation;

determining components for each of the modules of the method standard, wherein these components describe the parts of tools, which are required for realizing the module;

determining component parameters from the geometric parameters of the geometry features, wherein the component parameters comprise geometric parameters of the components or of the respective tools.

This method permits a partly or completely automated determining of the component parameters, by which means the engineering effort is significantly reduced. Further component parameters, apart from the tool geometry, are for example the base material, the hardening method (for certain components), material of the part, or construction space in the press.

In a preferred embodiment of the invention, the method as a further step includes:

determining component costs from the component parameters, for each of the components, wherein the component costs represent the machining costs and material costs caused by the respective components and the respective tools;

determining the total costs as a sum of the component costs.

With this, it is possible to largely automatically determine the costs, proceeding from a detailed processing model. A previously nonexisting accuracy and objectivity of the cost estimate with comparatively little work effort becomes possible by way of this.

In a preferred embodiment of the invention, the method as a further step includes:

determining a method plan, wherein a method plan comprises an ordered sequence of manufacturing steps and the geometric parameters of these manufacturing steps, by way of associating each of the modules with a forming operation, whilst taking into account constraints which limit the association in each case of a module, for example in dependence on the associations of other modules and of other constraints.

With this, it becomes possible to determine a method plan in a completely or largely automatic manner. The user interactions with a not completely automatic implementation, as a rule, concern design decisions, thus no fundamental method steps. Basically, in each case, one may fix preferred variants in advance for such decisions. The method may then take its course in a completely automatic manner.

In a preferred embodiment of the invention, the method as further steps for determining a cost-optimal method plan includes:

determining a method plan;

determining the component costs and determining total costs as a sum of the component costs for this method plan;

modifying, in particular iteratively, parameters of the method plan and newly computing the total costs by way of an optimization method, wherein the modified parameters include at least one of:

associating different pivot positions with the operations;

associating different method standards with a geometry feature;

associating different variants of a component with a module;

associating modules with operations;

different grouping of components; for example holes, possibly in different manners, may be grouped into hole groups which in each case share a cam.

The interactive modification and new computation of the costs is effected until a predefined abort criterion of the optimization method is fulfilled.

The different steps mentioned above are generally explained hereinafter.

Determining the Pivot Position

In a preferred embodiment of the invention, at least one pivot position of the part is determined, that is, an orientation with respect to the main working direction of the respective press. The pivot position or the part position is to be set such that the following demands are fulfilled as well as possible:

No or hardly any backdraft (undercut), which means that as many regions as possible can be formed from the working direction.

Uniform drawing depth, in order to effect, during the drawing, a central engagement point and a uniform stretching of the material.

The evaluation of the pivot position may be implemented basically in a purely manual, completely automatic or semi-automatic manner. In the simplest case, an operator manually sets the two angles that define the pivot position.

Feature Recognition

Regions on the part which have to be machined after the deep drawing in further operations, have geometric properties which differentiate them from the rest of the geometry, so that they may be, to a great extent, automatically recognized. Such regions, hereinafter called features or geometry features, are preferably of one of the following feature types:

holes openings punchings (piercings)

backdrafted (undercut) regions flanges posfforming regions edge regions

The feature recognition may basically be implemented in a purely manual, completely automatic or a semi-automatic manner, which is to say with user interaction. A large part of these features may be recognized by way of geometry analysis algorithms which search the part for regions with the respective characteristics (e.g. regions at the edge which are separated from the remainder by a small radius) in a targeted manner. Simple mechanisms may simplify the selection of such regions for non-recognized features: proceeding from a patch (or a curve) clicked on by the user, the computer automatically selectively searches for a feature which comprises this patch.

The features which are extracted in this manner are described by their feature types, that is, their geometric shape. The geometry may be represented by a polyhedral model or by a parametric model. In a parametric model, simple geometric elements or bodies and their parameters describe a surface or a body. For example, a three-dimensional surface may be defined by the displacement of a two-dimensional curve (generatrix) along a curve (directrix) in space.

With a polyhedral model, the coordinates of the network points may be considered as model parameters.

Method Standards

For each feature, there are several combinations of manufacturing steps with which they may be realized. Thus e.g. a simple L-flange as a rule may be manufactured in that it is either firstly cut and then folded or vice versa. A further example is a punching which as a rule is cut and then punched through. Such a possible combination of manufacturing steps is hereinafter called "method standard".

The method standards are constructed in a modular manner: for each feature, everything which is implemented on this feature within an operation corresponds to a module. Thus for example, the method standard "cutting+punching" (for realizing a punching) consists of the two modules "cutting" and "punching", the method standard "cutting+punching in one go" on the other hand consists of only one module, since the cutting and the punching are effected in the same operation.

The modular construction permits the user to combine predefined modules with one another, and in this manner to create his own (company-specific) method standards. Depending on the company and the quality class, different method standards are selected for realizing a feature.

Component Data

In order to have a basis for the cost calculation, for the modules, the parts of the tools which are required for the realization of the module are described. These parts are hereinafter called "components" and are evaluated automatically in the following manner:

1. As a rule, for a module, it is always the same types of components which are required (e.g. for cutting a flange, as a rule one requires a top knife and bottom knife, for cutting an opening one requires, as a rule a cutting punch, cutting die, punch retainer plate and stripper plate). These components are hereinafter called module components. A module component does not contain the specific characteristics of the components, such as e.g. length, width, material, etc. The specific characteristic of a module component is hereinafter called tool component. If one stores the required module components for each module, then they may be automatically added when the module is used.

2. Each feature is a collection of parameters which describe it (such as e.g. length, width, volume, . . . ). Analogously, one may describe each tool component by way of its most important parameters. In order now to get from the module component known from point 1. to the specific tool components with the help of the feature, computation rules or mappings of the feature parameters to the cost parameters are stored. Each component parameter (wherein preferably only those parameters relevant to the costs are acquired) is thus provided with a value with the help of the feature parameter (e.g. diameter of the hole punch=diameter of the hole). Knives, jaws and segments form a special case: here, the user may set the standard lengths which are familiar to him (as a rule 300-400 mm). For knives, then the cutting lengths are divided by the standard length in order to get to the correct number of knives for the calculation (if an adequately large remainder remains on division, then additionally a knife with the length of the remainder is also included in the calculation, but if the remainder is small, then one or more of the knives is given an increased length). One proceeds in an analogous manner for jaws and segments.

3. Each tool component—depending on the extent of its parameters—entails a certain cost in the individual process steps of the procedure of creation of a tool. For the example of a jaw, this is as follows: the essential parameters are length, width, height, material (cast/semi-finished product) and hardening method (quench & temper/through-hardened/laser hardened/induction hardened). A jaw e.g. entails work cost on milling and drilling the large-cast (milling the pockets), on milling and drilling the jaw itself, on preassembly, on hardening, on spot-grinding and with the final assembly (spot-grinding of the abutment and bearing surfaces). It furthermore gives rise to a certain material consumption.

With the help of stored data from practical experience, which comprises the cost or material consumption, hereinafter called resource consumption, for different parameter characteristics, by way of regression analysis one may determine mapping functions which map parameter values to the resource consumption. All these functions are stored in a database, so that for each automatically generated component, one may select the fitting consumption functions from the database and evaluate them, by way of the parameter values of the components.

Basic Structure

In the previous section it was explained how all components required by the modules are automatically produced in the correct size, and the resource consumption caused by them may be computed. Additionally, all components in the tool which are not required for realizing a certain feature, the so-called basic structure, are also required for a complete cost calculation. For this, all components which potentially occur in a basic structure—analogously to the other components— are stored in a database with their most important parameters, and with the consumption functions that are dependent on these parameters. These are then combined into different basic structure packages, from which the user may select one (with a deep-drawing tool there are for example the basic structures "double-acting", "single-acting with casting bath" and "single-acting with base plate (of steel)"). The user may himself also define such packages. The evaluation of the parameter values for the basic structure components is effected analogously to that of the other components, with the difference that in this case no feature parameters are incorporated, but values which are determined by the part as a whole (its length, width, etc.).

Common Components

It may be the case that modules share one or more components, e.g. with holes which may not be manufactured in the press working direction and which may be realized by way of the same cam. Common components may be automatically determined by way of a comparison of the computed, preferred working directions. Examples are:
holes lying close to one another, which are manufactured from the same working direction, within a certain tolerance, are grouped into a whole group which share certain components (e.g. punch retainer plate),
in an analogous manner, hole groups, which may be realized by way of the same hole cams, are determined,
adjacent features which in a module each require a filler cam: in case these filler cams have the same working direction, they can be implemented by a single shared filler cam which then is represented as a common component.

The user may also intervene with the creation of the coarse method, have the components associated with the modules displayed, and manually define common components. The components are then only produced once, wherein the computation of their parameter values is adapted to the particularities. The hole cam is for example enlarged accordingly.

Constraints

So-called "constraints" are fixed in order to automate the creation of the coarse method as much as possible. These are constraints which are to control the distribution of the modules to the operations. There are three different types of constraints:
constraints with respect to the sequence: module A must be manufactured before/after module B,
constraints with respect to the simultaneousness/exclusion: module A and B must/may not be manufactured in the same operation,
constraints with respect to operation types: module A may not be manufactured in operations of the type x (e.g. in the same step as the billet section, i.e. when cutting the billet).

Many constraints may be derived from method standards and the components:
the sequence of the modules within a method standard is mandatory, i.e. they must also appear in the method plan in this sequence,
if two modules have a common component, then they must be manufactured in the same operation,
for most modules, one may rule out operation types in which they may not occur (e.g. folding may not be effected with a billet cutting tool, drawing- or cutting tool).

Furthermore, one may determine geometric constraints by way of taking into account the geometric dimensions of the components, for example the space which the components take up with their work: if there is too little space for the components of modules of adjacent features, then they must be associated with different operations.

Constraints therefore may be of a different origin: they may be set by general rules which are always valid, or corresponding to the effectively used method standards, or on account of the effective part geometry and thus of the tool geometry.

Additionally to these "hard" constraints" which must be adhered to in each case, one may also define "soft" constraints which are to be fulfilled where possible, but which however are not compelling. Examples are preferred "time points" for certain modules (e.g. holing should always be effected in the last operation, or, alternatively, always directly after the deep-drawing); or the common manufacture of two modules in one operation if certain auxiliary conditions are fulfilled (e.g. separate flanges whose distance is smaller than a certain limit value x, should, if possible, be all folded together). The user also has the possibility of fixing further hard and soft constraints.

Optimization

The goal of the planner is to find a method plan which may be realized as inexpensively as possible. Basically, eliminating an operation has a high potential for savings. However, this saving as a rule must be made at the expense of a more complicated cam design in one of the remaining operations. By utilisation of the constraints explained in the preceding section, and by means of (e.g. combinatory and/or stochastic) optimization methods, one may find an operation number and a distribution of the modules onto the operations, which minimize the costs.

Such an optimization method is successively refined by way of taking into account other influence parameters:
considering different (permissible) variants of a component (e.g. flex cam instead of standard cam).
considering different (permissible) method standards.
grouping of components.
As a further step, preferably a
considering of different pivot positions in the individual operations is effected. If one changes the pivot position, then possibly certain features for which a cam was previously required, may now be machined in the press working direction, and thus the cams may be eliminated. Then however, an additional cam may be required for other features, in case the respective module cannot be moved to another operation with a more favourable pivot position.

If one joins the ideas of the preceding sections, which partly build upon one another, then an overall concept for the semi-automatic creation of a method plan and a fully automatic cost calculation resulting therefrom results therefrom. This is shown in an overview in FIG. 1:

For each step, the system computes a proposal (middle column) proceeding from the 3D part geometry. The user may configure the manner of functioning of the system to a certain part before application to a certain part. That is, he may adapt it to the part's particularities, by way of changing the configuration (right column).

This configuration comprises:
definition of the features (e.g. starting at which circumference should a hole, rather be considered as an opening),
constructing new components (or modification of existing ones),
constructing new modules (or modification of existing ones),
composing new method standards (or modification of existing ones),
composing new basic structures (or modification of existing ones), changing certain mapping parameters (e.g. standard knife length), constructing new resource consumption functions for the individual components (or modification of existing ones), adapting the hourly costs and material costs.

Thus all important particularities specific to the company may be taken into account with the computation.

With the use of the system, the user at each point in time—if this is so desired—has the possibility (but not the necessity) of interacting, and modifying the computed suggestion in accordance with his wishes (left column). He may redefine features (e.g. because a flange is to be treated like a postforming region at the edge, or a hole as an opening, because there is no suitable standard hole punch), select another method standard for a feature, select another basic construction for a tool, define common components (see above), select another variant of a component, shift modules into other operations (inasmuch as no constraint is violated), define additional constraints.

Calibration

The resource consumption functions map the influence variables to the resource consumption. If during the tool manufacture, the required resources (times for the manufacture and assembly of tool components, material consumption) were determined, then these together with the influencing variables may be integrated into an experience database.

Proceeding from this, one may determine the parameters of the consumption functions afresh by way of e.g. regression analysis. Thus, the calculation becomes more acute with an increasing number of manufactured tools, and also has the possibility to adapt to changes in manufacturing processes or productivity increases.

The presented method structures the method plan in a manner such that it is extended continuously during the whole planning process, and may be refined e.g. by way of the incorporation of active surfaces for the forming tools or by way of storing the volume models of the components. The structured method plan may be used in particular for the communication with suppliers, in order to exchange more information on parts (features), methods and costs, or to render change suggestions and costs which these entail, plausible or to render them more understandable by the other party.

The results of all planning steps are always visible. Redundant work, and inconstant states of planning which accompanies this, are avoided. Further parts of the planning may be automated. Critical parts may be examined in a more detailed manner in earlier phases. The cost calculation is significantly quicker and more efficient. Depending on the degree of maturity, the method plan preferably comprises all data, in order to carry out a cost analysis, process simulation, kinetics analysis and collision analysis, or an analysis of the dynamic behaviour of the tool. These analyses preferably are applied at various points in time for increasing the planning security.

Differing from current approaches, the costs are derived from the processes stored in the method plan and from the exact product data. The costs always reflect the current state of planning. The calculation is objective, comparable, reproducible and understandable. The consumption functions which map the influence variables to resource consumption in the steps for manufacturing the tool, may be configured as well the cost schedules relating to manufacturing (hourly rates etc.) or buying of tools.

The data processing system for the computer-aided generation of tool parameters for tools for manufacturing sheet-metal forming parts by way of forming processes comprises storage means with computer program code means stored therein, which describe a computer program, and data processing means for implementing the computer program, wherein the implementation of the computer program leads to the execution of the method according to the invention.

The computer program for the computer-aided generation of tool parameters for tools for the manufacture of sheet-metal forming parts by way of forming processes may be loaded into an internal memory of a digital data processing unit, and comprises computer program code means, which when they are implemented in a digital data processing unit, cause this to execute the method according to the invention. In a preferred embodiment of the invention, a computer program product comprises a data carrier, or a computer-readable medium, on which the computer program code means are stored.

Further preferred embodiments are to be deduced from the dependent patent claims.

BRIEF DESCRIPTION OF THE DRAWINGS

Hereinafter, the subject-matter of the invention is explained in more detail by way of preferred embodiment examples, which are represented in the accompanying drawings. In each case there are schematically shown in:

FIG. 4 a list of method standards associated with feature types;

FIG. 5 a list of feature types and module types with associated module components;

FIG. 6 a list of module components with associated specific components;

FIG. 7 a list of components with associated selection variables; and

FIG. 8 a list of components with associated cost functions.

The reference numerals used in the drawings and their significance are listed in a grouped manner in the list of reference numerals. Basically the parts which are equal in the figures are provided with the same reference numerals.

DETAILED DESCRIPTION OF THE INVENTION

Figure 1:
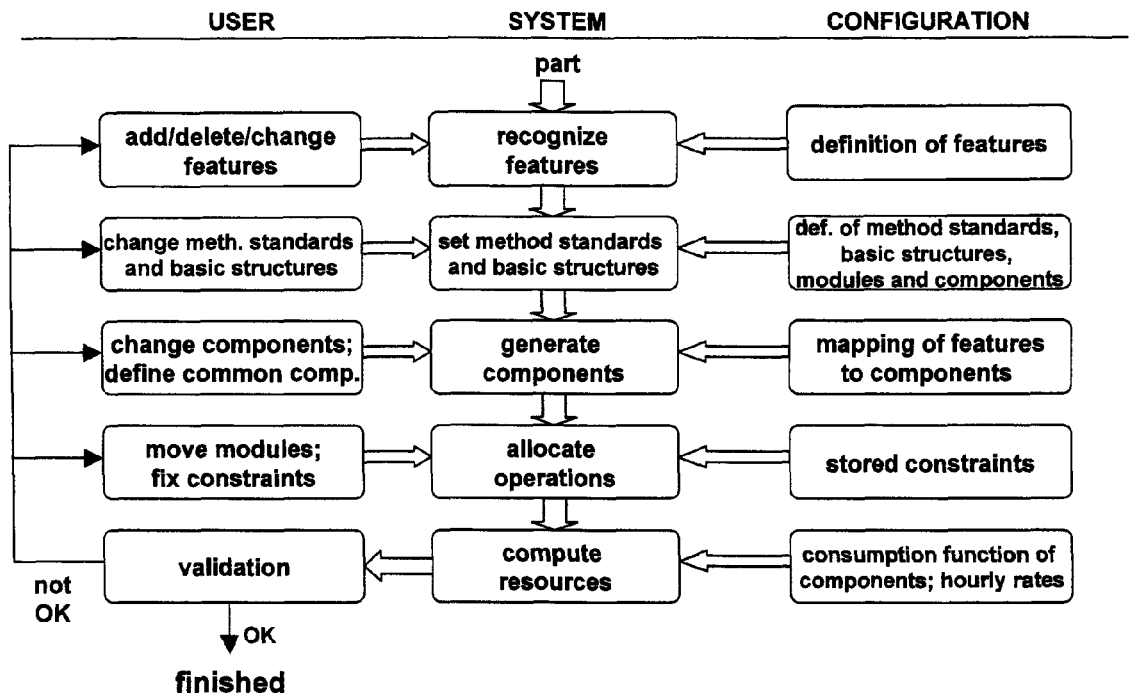
FIG. 1 an overview of the method.
Figure 2:
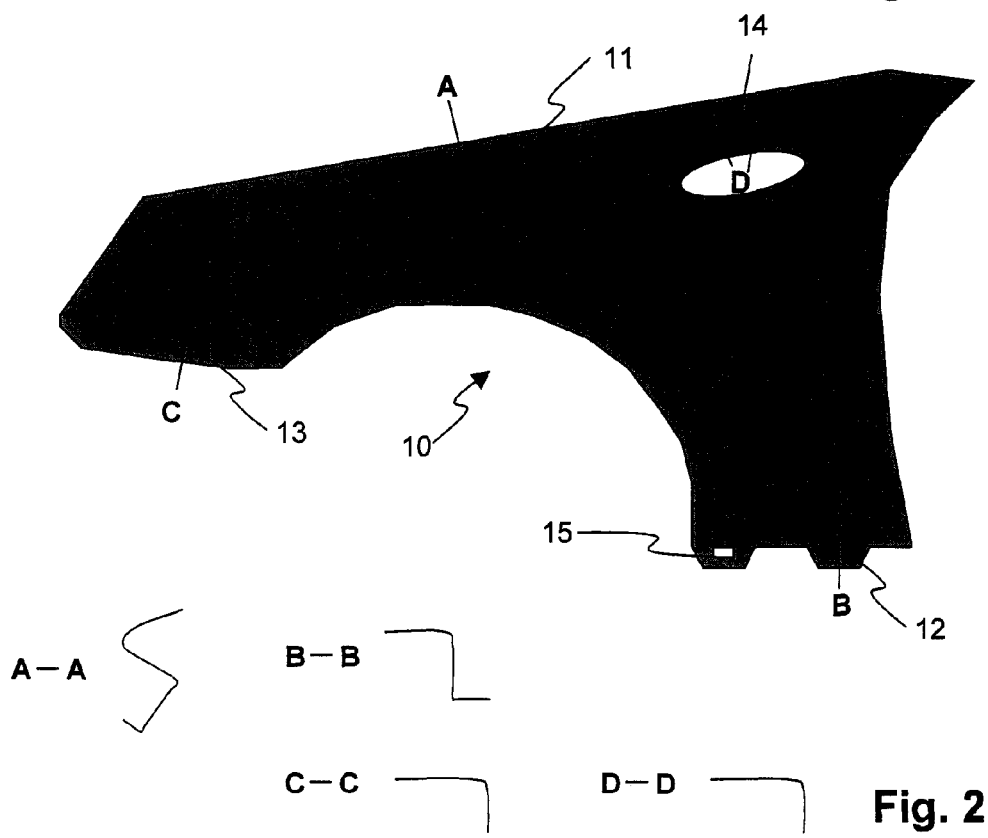
FIG. 2 a sheet metal part.

FIG. 2 schematically shows a sheet-metal part. The part is a front part of a car body, with a water channel (type: back-drafted postforming) along the edge 11, a sill connecting flange 12 (type: postforming), a bumper connecting flange 13 (type: flange, a hole 14 for an indicator (type: punching), and a hole 15 in the sill connecting flange (type: rectangular hole). The sections A-A to D-D show schematic cross sections in these regions. The types specified above are the respective feature types.

Hereinafter, by way of example, firstly the automatically evaluated model data for this part is described, subsequently the basic relations and data structures are explained in a more detailed manner.

The features and their types are set by a user or are automatically recognized. A stored table associates at least one method standard with which such a feature may be manufactured, with each feature type. A method standard is a sequence of modules, wherein a module is a machining unit which may be carried out in an operation. A selected method standard is specified in the following table for each feature type for the example, wherein "FC" is an abbreviation for "filler cam":

| section | feature type | method standard (proposal) | modules |
|---------|--------------|----------------------------|---------|
| A-A | backdrafted postforming | precutting, folding postforming with filler cam cam-cut | cutting, folding post forming with FC cutting not Z |
| B-B | Z-flange | cutting, postforming | cutting, postforming |
| C-C | L-flange | cutting, folding | cutting, folding |
| D-D | punching hole 15 complete part part edge | cutting, punching holing drawing billet cutting | cutting, punching holing drawing cutting |

A further stored table associates at least one variant of module components with each module. Components are parts of tools with which the module may be implemented. The following table shows the resulting module components for the example:

| feature type | module | module components | | | | |
|---|---|---|---|---|---|---|
| backdrafted postforming | cutting | top knife | bottom knife | | | |
| | folding | active flanging jaw | passive flanging jaw | | | |
| | postforming with FC | active postforming jaw | passive postforming jaw | cam | filler cam | |
| | cutting not Z | top knife | bottom knife | cam | | |
| Z-flange | cutting | top knife | bottom knife | | | |
| | postforming | active postforming jaw | passive postforming jaw | | | |
| L-flange | cutting | top knife | bottom knife | | | |
| | folding | active flanging jaw | passive flanging jaw | | | |
| punching | cutting | cutting die | punch-retainer plate | cutting punch | stripper plate | |
| | punching | folding jaw | punch-retainer plate | shape punch | holding-down plate | |
| hole | holing | cutting die | punch-retainer plate | hole punch | stripper plate | |
| part | drawing | die | sheet-metal holder | punch | | |
| part edge | cutting | top knife | bottom knife | stripper plate | | |

The parameters of the components are created in a component instantiation process according to parameters of the features which are created by means of the component. Typical rules for the example are specified in the following table. The rules are stored in the form of executable program instructions. Predefined, stored functions are indicated by $f_1$ and $f_2$:

| component | parameter | instantiation rule |
|---|---|---|
| top knife | length width height hardening method material | flange length + allowance $f_1$ (knife length) $f_2$ (knife length) laser hardening semi-finished product |
| bottom knife | length width height hardening method material | flange length + allowance $f_1$ (knife length) $f_2$ (knife length) laser hardening semi-finished product |
| ... etc | ... etc | ... etc |

Thus the properties of the tool components are known, and from this, in the next step, the resource consumption for manufacturing the tools is determined. This, as a rule, is stored as functions $f_1, f_2, \ldots f_n, f_m \ldots, g_1, g_2, \ldots g_n, g_m \ldots, h_1, h_2 \ldots h_n, h_m \ldots$ of one or more variables. Typically, these variables are one or more of the geometric dimensions (length L, width B, height H) or further parameters which are known on account of the instantiation of the components described above. The following table shows consumption information or cost functions for different processing steps for the manufacture of components.

| Component | consumption functions (in dependence on the parameters) | | | | | | | |
|---|---|---|---|---|---|---|---|---|
| | method planning | design | milling&drilling | laser-hardening | end-assembly | cast steel 1.2385 | nodular cast iron GGG 50 | ... |
| top knife of cast metal, laser hardened, L = 350 mm, B = ... | — | $f_1(L)$ | $f_k(L, B)$ | $f_n(L)$ | $f_m(L)$ | $f_r(L, B, H)$ | — | ... |
| bottom knife of cast metal, laser hardened, | — | $g_1(L)$ | $g_k(L, B)$ | $g_n(L)$ | $g_m(L)$ | $g_r(L, B, H)$ | — | ... |

-continued

| Component | \multicolumn{7}{c}{consumption functions (in dependence on the parameters)} | |
|---|---|---|---|---|---|---|---|---|
| | method planning | design | milling&drilling | laser-hardening | end-assembly | cast steel 1.2385 | nodular cast iron GGG 50 | ... |
| L = 350 mm, B = ... | | | | | | | | |
| ... | ... | ... | ... | ... | ... | ... | ... | ... |
| filler cam, individual manufacture, L = 350 mm, B = ... | — | $h_1(L)$ | $h_k(L)$ | ... | $h_m(L)$ | ... | $h_s(L, B, H)$ | ... |
| ... | ... | ... | ... | ... | ... | ... | ... | ... |

The consumption functions indicate the resource consumption, thus working hours or material consumption or machine use times etc. The monetary costs are determined by way of the known cost per unit of the respective resource.

Figure 3:
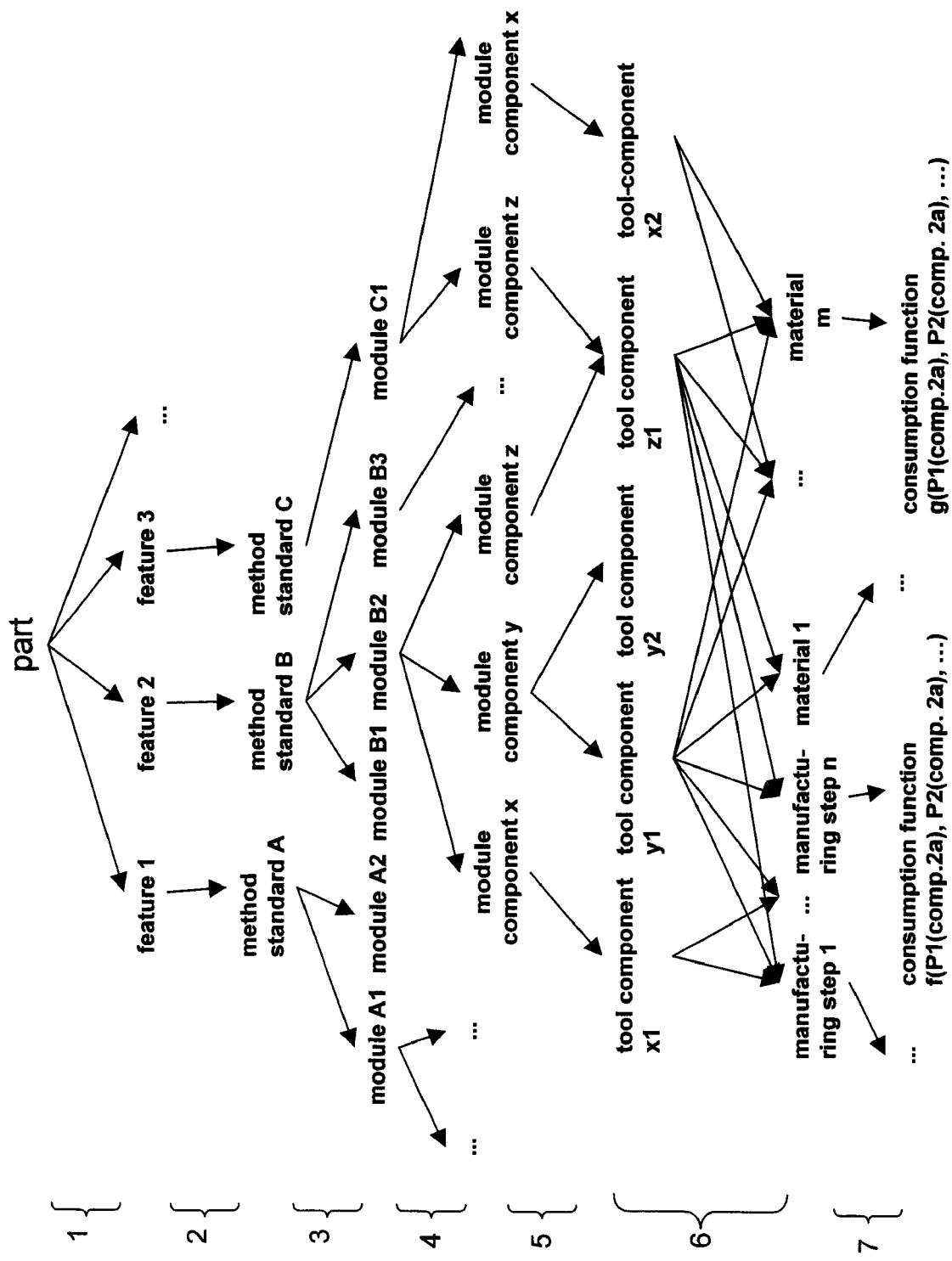
FIG. 3 a structure of the data for modelling a sequence of forming steps.

FIG. 3 shows a structure of the data for modelling a sequence of forming steps. This structure on the one hand applies to the entirety of the generally used data which is stored and kept ready in the computer system before implementing the automatic method. This is hereinafter called "general model". On the other hand, the structure applies to data for a certain part, said data having been selected from the general data by the method and having been instantiated by way of the geometry parameters of the part. This is hereinafter called "instantiated model".

P1, P2 indicate parameters of the components in the consumption functions of the figure.

The arrows in the figure in each case indicate an association. Typically, the associations may be represented by tables. All the features of a part are associated with this part on a first association level 1. This association only exists in the instantiated model.

A method standard is associated with each feature in a second association level 2. In the general model, this may be more than one method standard per feature. In the instantiated model, precisely one method standard per feature is selected by the user or automatically.

One or more modules are associated with each method standard on a third association level 3. This association is defined by the general model and is adopted in the instantiated model.

One or more module components are associated with each module, depending on the feature type, on a fourth association level 4. This association is defined by the general model and is adopted in the instantiated model.

A tool component is associated with each module component on a fifth association level 5. Thereby, one or more tool component(s) may be associated in dependence on the feature parameter, i.e. one or more mould jaws may be associated with a single elongate flange. This association in the general model is predefined by tables, combined with computation rules. In the instantiated module, the parameters of the tool component(s) are determined by way of these computation rules. Furthermore, one or more tool components are replaced by a single common component in dependence on certain criteria. Thus for example, for two holes for which the angle between the machining directions lie within a certain tolerance and whose distance is smaller than a certain limit value, the associated punch retainer plates are replaced by a single one. Its size is determined from the hole sizes and the distance of the holes.

One or more resources which are consumed for preparation due to manufacture, purchase, machining etc. of the components or by way of the machining of other components caused by the components, and together determine the preparation cost, are associated with each tool component on a sixth association level 6. This association is defined by the general model as a table of resources and is also adopted in the instantiated model.

Consumption functions for determining the costs as a function of the component parameters are associated with each resource on a seventh association level 7. This association is defined by the general model for computing these functions in dependence on the component parameters. The sixth and seventh association level may also be grouped together by a single association of consumption functions to tool components.

The stored tables and computation rules form a calculation scheme. The relations and data structures for the individual association levels are hereinafter explained in a more detailed manner:

First Association Level

What is a feature (part detail)?

a feature is a detail in the part geometry, it fulfils a certain function (attachment flange, cable opening, design, etc.), requires a certain manufacturing quality (different tolerances at hole for the mounting in basic structure, holes for the attachment of coverings, holes for the run-off of paint after a paint bath etc.), the realization may be described by a succession of local forming-, bending-, punching- and cuffing operations, each feature has a certain type (flange, opening), which depends on the geometric properties of the feature. Thus, it is not features as such but firstly feature types which are automatically recognized, with regard to the drawing operation, the whole part or larger part regions are considered as a feature, with regard to a billet cutting operation, the complete part edge is considered as a feature.

The following list provides a set of feature types which are preferably present in the computer-based model and are treated further in the lower levels of the structure tree:

| | |
|---|---|
| round hole | flange |
| round hole not Z | flange not Z |
| rectangular hole | postforming |
| rectangular hole not Z | postforming not Z |
| slot | part (region) for drawing |
| slot not Z | outer edge |

-continued

| | |
|---|---|
| special hole | segment outer edge |
| special hole not Z | segment outer edge not Zz |
| opening | segment opening |
| opening not Z | segment opening not Z |
| punching round | |
| punching round not Z | |
| punching slot | |
| punching slot not Z | |
| punching rectangular hole | |
| punching rectangular hole not Z | |
| punching special hole | |
| punching special hole not Z | |

The descriptions "not Z" in each case, indicate that the feature is to be manufactured with a cam. (The geometric direction "Z" is the vertical one, thus the main working direction of a station, whereas a cam on the other hand moves horizontally or obliquely, thus "not in the Z-direction"). The feature type "slot" is, for example, automatically recognized. If the user for certain reasons wishes to set the feature being manufactured with a cam, he may change the feature type in "slot not Z". Different method standards are associated with this feature type than with the "slot" (see below). A special hole is a hole, whose shape neither corresponds to a round hole, neither to a rectangular hole, nor a slot. The same applies for the punching of a special hole.

The automatic recognition of feature types preferably starts from a polyhedron model or a parametric module of the part. Thereby, two procedural methods are possible: certain models as a rule are put together by the CAD (computer aided design) designer, from individual part surfaces. Such part surfaces often correspond to the features to be identified. For example, a radiator cover is composed of two essentially flat sections and several complicatedly shaped edge regions. The features are recognized therefore by way of the model structure according to a first procedural manner. According to the second procedural manner, the geometry, thus the shape of the modelled part, is analysed. Thereby, one falls back on generally known standard methods of computer-based geometry processing (computational geometry), such as for example the computation of cross sections through a body, the computation of the curvature of a surface, the automatic determination of holes and edges, etc.

Features are typically holes, openings, punchings, flanges as well as postforming regions. In order to find flanges or postforming regions, one removes all roundings whose radius falls below a certain limit value, e.g. 4 mm, from the part. By way of this, the part is broken down into several sub-parts, which subsequently are examined once again in a more accurate manner. Edge regions which are separated away and which lie on a plane or on a general cylinder surface, are recognized on the outer edges as a folding flange, and on a hole as a punching, otherwise they are postforming regions. Regions in the inside of the part, which are separated from the part by way of the removal of the rounding, are likewise recognized as postforming regions. The previously eliminated roundings which have led to the separating-away of the regions, are associated with these. Eliminated roundings which do not lead to a separating-away of a region, are identified as independent postforming regions. Backdrafted regions (not Z) may be identified by way of the analysis of the angle between the surface normal and press working direction. Holes, openings and edges are given by the topology of the part surfaces at the locations at which no adjacent part surfaces are present. Holes and edge regions (not Z) which are not manufacturable from the press working direction may basically be identified by way of analysis of the angle between the surface normals along the edge, and the press working direction. In particular, for this, the cutting angle and the shear angle may be computed and used. The cutting angle is the angle between the surface normal and the projection of the working direction onto the plane which is spanned by the surface normal and the surface tangent. The shear angle is defined analogously, with a projection onto the plane by the normal and binormal.

The evaluation of the feature parameters accompanies the identification of the features, wherein preferably those which are required for determining the component parameters of the module components occurring in the modules defined for the features are computed. These are round hole/round punching: area, radius
slot/slot-punching: periphery, area, length, width
special hole/special hole punching: periphery, area
opening: periphery, area
flange/(backdrafted) postforming region: length (=length of the radius, along which one folds or postforms), cut length (=length of the outer edge on the flange/postforming region), area
outer edge/segment outer edge/segment opening: length
part region for drawing; length, width area Second Association Level Each feature has a certain type: this fixes the default method standard as well as the selection of alternative method standards for the feature. The method standards which are considered are stored for each feature type and may be changed by the user. The method standards reflect preferences and quality demands which are specific to the company and customer.

Example 1

Feature "Indicator" with the Wing type "punching special shape"
default method standard: "holing, punching" (2 modules)
alternative method standard:
   "punching in one go" (1 module)

Example 2

Feature "Bumper Connecting Flange" at the Wing type "flange"
default method standard: "cutting, folding"
alternative method standards:
   "folding"
   "cutting, folding, cutting with cam"
   "cutting, folding, postforming with filler cam"
   "folding, postforming with filler cam, cutting with cam"
   "cutting with cam, folding, postforming with filler cam"
   "cutting with cam, postforming with filler cam"

Example 3

Feature "Hole in Sill Connecting Flange" at the Wing type "rectangular hole"
default method standard: "holing"
alternative method standard: none, for standard holes there is only "holing", if one wishes to hole via a cam for example, one may then change the feature type "rectangular hole not Z", which has the method standard "holing via cam"

Third Association Level

Each method standard consists of one or more modules, thereby a module corresponds to that which is realized within an operation on the respective feature. For example, the modules "folding" and "cutting via cam" together form a method standard. FIG. 4 shows such a list of feature types and associated method standards. For each features type, either only a single method standard is specified, or several method standards for this feature type are listed amongst one another. The names of the method standard as a rule are self-explanatory, i.e. they contain the names of the modules contained in them. For this, see also the above examples of the method standards.

For example, the feature "punching round not Z" means a punching which is produced with a cam not in the Z-direction. The feature may be manufactured with one of three method standards. In a first one, the holing and also the punching is effected with a cam. In the second, the holing is effected in the Z-direction and subsequently the holed section is punched through with a cam. Such a method standard is required, for example, if the punching lies on a flange which is firstly laid out—for this reason the hole may be manufactured from Z—and then folded, which renders a punching from "not Z" necessary. In the third method standard, the holing and the punching is effected from Z—as with the second variant, this is for example required for punchings on a firstly laid-out flange.

Fourth Association Level

For each feature type and each module of its method standards, is stored as to which module components are required in order to realise this module. FIG. 5 shows such a list of feature types and module types with associated module components. The module components may, as in the figure, also be described as "component types". All method standards defined for a feature type arise by way of combination of the modules defined in this list. For example, the feature type "punching round" may be produced by a method standard with the modules holing/punching. The following columns specify the used components:

Example 1

Feature Type "Punching Round"

The module "holing" as module components requires (not all columns of the representation are visible in FIG. 5): cutting punch, punch retainer plate, cutting unit, thrust plate cutting unit, stripper plate, cutting die, and die retainer.

The module "punching" requires the module components: flanging jaw, retainer forming unit, thrust plate forming unit, retainer, folding punch and holding-down plate.

Example 2

Feature Type "Flange"

Module "folding" requires the module components active jaw and passive jaw.

Module "folding with cam" requires the module components active jaw, passive jaw, flange cam and cam holding-down device.

Module "postforming with filler cam" requires the module components active jaw, passive jaw, filler cam, flange cam and cam holding-down device.

Module "cutting" requires the module components top knife and bottom knife.

Module "cutting with cam" requires the module components, cutting cam, cam holding-down device, top knife and bottom knife.

Fifth Association Level

In order now to get from the module component (e.g. "hole punch round") to a "real" existing tool component (as one may purchase it, e.g. "1 hole punch round, radius 6 mm"); and from the real (i.e. physical) tool component to the resource consumption caused by it, firstly the parameters on which these associations depend (for hole punch round" these are e.g. radius, length and material) are determined for each component. These associations are stored in the calculation scheme.

FIG. 6 shows such a list of module components with the respective component parameters. A module component becomes an instantiated or specific tool component by way of providing the parameters with fixed values. For example, in FIG. 5, the parameter "hole punch round" is listed in the region 51. Each parameter of a component is provided with a value which is computed from the geometry of the associated part detail; and/or values specific to the part or order, such as sheet metal thickness, sheet metal material, tool size etc.

Properties such as material or hardening method are represented by sign sequences or by a number (with reference to a list of descriptions). The associated association rule is called instantiation rule, and is likewise stored in the calculation scheme. For example, rules for the parameters of "hole punch round" are listed in the region 52 in FIG. 6. The variable names in the column "instantiation rule" are related to parameters of the associated feature ("radius", "length"), or parameters of the components themselves, which have already been computed (beginning with "CO_ . . . "), or parameters which are substantiated in dependence on data specific to the part or order (which the user may change at the running time), (beginning with "CD . . . "), or to parameters which are given in a fixed manner for these components (material descriptions "HSS" or "M_05").

Examples of the use of the geometry of the associated part detail for determining component parameters are already given in the introductory example, thus knife length=f (flange length). Further examples are:

radius of the hole punch=radius of the round hole length of the flange cam=length of the flange+200 mm width of the cutting tool holding-down device=20.2381+ 1.07619*width of the component.

An, as similar as possible, "real" instance is determined from the database for the computed parameter values. For each parameter value, one must specify what is to happen when the specific value (which possibly is also adulterated a little by rounding errors) is not present in the database: should the next, the next largest or the next smallest value be taken, or should there be an error note? This is in the rounding rules. In FIG. 6, rounding rules are listed in the region 53.

Examples of the component instantiation: feature "bumper connecting flange" at the wing:

feature type: flange assumptions selected method standard is the default "folding"

length of the flange: 430 mm selected standard length for the jaw: 350 mm (the user may fix this via a menu in GUI).

required module components: active jaw, passive jaw active- and passive jaw in each case have the parameters length, width, height material and hardening method since the flange length is larger than a predefined standard length, two passive and two active jaws are produced in each case one of the length of 350 mm and one of the length of 80 mm width and height of the jaw are computed from their length, material and hardening method are set by default values which the user may change when desired in the GUI (graphical user interface).

For each component occurring in the calculation scheme, there are one or more entries for the different real variants of the components, in the component database.

One entry consists of names of the component variants specific values (or value regions) for the individual component parameters possible further information (standard, . . . )

consumption functions for the cutting steps or materials, which are dependent on the parameter values.

FIG. 7 shows a list of components with associated selection variables. For example, there is a hole punch with the radius 1, 1.1, 1.2, . . . up to 8.3, 8.4 mm, in each case with a total length of 71 and 80 mm from the material HWS (chrome-alloyed special steel according to DIN 9861). The selection variables of radius, length, material correspond to the component parameters in the calculation scheme. Thus by way of the specific component parameter, a closest-lying real tool component is found by way of systematic search of the table.

Sixth and Seventh Association Level

FIG. 8 shows part of a list of tool components with associated cost functions or consumption functions, thus functions which compute the source consumption in dependence on the selection variables and possible other values such as tool size etc. ("machining cost" in the columns). Since the parts shown are bought, there are no entries in the "semifinished" and "hardening" columns. For parts manufactured in-house, these columns comprise formulas of a similar structure. The list shown in FIG. 7 is combined with the list of FIG. 6, it is only shown separately for reasons of space. Thus for each component, the resource consumption caused by it may be determined with the help of the component database. Thereby, possible small purchase parts are grouped into a "standard part package"

In order to obtain the costs for a tool, one then further sums the costs for the individual components for each process step or for each material, multiplies the sum per process step by the respective hourly rate multiplies the sum per material by the respective material cost rate, and sums the costs resulting therefrom.

Supplements are multiplied thereby, depending on the part type (planking, inner part) and the material (steel, high-strength steel, aluminium).

The total costs may thus be represented as the following sum:

$$\sum_{k=1}^{\# Operations} \sum_{i=1}^{\# Components\ in\ Operation\ k} \left( \left[ \sum_{j=1}^{\# ProcessSteps} h_{ij}^k * HC_j \right] + \left[ \sum_{r=1}^{\# Materials} m_{ir}^k * M_r \right] \right)$$

wherein $h_{ij}^k$ is the working time for the component i in the process step j in the operation k, $HC_j$ the hourly rate, $m_{ir}^k$ the material consumption, and $M_r$ the material cost rate. Thereby, working hours or material consumption per component are computed depending on the respective component parameters and possibly global parameters (supplement rates, . . . ).

The structure tree of FIG. 3 thus shows the relationships via which the resource consumption for each feature, and from this for each module, are computed by way of components and module components.

Updating the Consumption Functions

In a preferred embodiment of the invention, the cost functions or their parameters are updated in accordance with the actual cost. For this, one acquires the actual cost in hours and material with the production of the tools or their components, and this is stored together with the physical selection parameters of the components. For example, the functional relation between the expense and the component parameters is determined by way of regression analysis. The new functional relation replaces the previous consumption function.

Production of the Method Plan

In order to determine a complete method plan, the modules are distributed over the operations. This also permits a cost distribution to the individual operations. The distribution is effected whilst taking into account a series of additional conditions, hereinafter called constraints. There are various types of constraints, which control the distribution of the modules over the operations:

simultaneousness: two modules must be manufactured in the same operation:

Example, several "holes not Z" lying close to one another are manufactured via the same cam. Such a constraint is automatically produced from a user selection "common component", which links the holes to one another. The respective "holing" modules must therefore be in the same operation.

exclusion: two modules may not be manufactured in the same operation:

Example: side wall: "post forming with cam" for feature A-column, top and "postforming with cam" for feature roof channel may not be manufactured together, since there is too little space for the two cams. Such a condition is preferably automatically produced, in that the tool positions and their space requirement are evaluated by a geometry model, and one checks as to whether the tools collide with one another or take up the same space. The tool positions and their working movement for this in turn are automatically derived from the part geometry, the volumes through which the tools travel are computed and examined with regard to overlapping.

Sequence: module A must be manufactured before or after module B

Example: the modules within a method standard may not be swapped.

Operation types: module A may not be manufactured in operations of the type x

Example: folding may not be in operations of the type "billet cut", "deep-drawing tool" or "cutting tool".

Constraints may thus be predetermined in a standard manner as general rules which must be adhered to in any case;

be associated as special rules for example to a certain method standard, and be automatically activated on its use;

be automatically generated as context-dependent rules by way of the analysis of geometric relations; or be manually set.

The modules are automatically associated with the operations whilst taking these constraints into account. Hereby, preferably the association is varied by an optimization method, in order to minimize the number of operations or also the costs or also a mixed function. The resulting combinatory optimization problem may, for example, be formulated as a ILP (integer linear program). For this, optimization methods are for example known as:

cutting plane,
branch and bound method,
Lagrangian decomposition,
constraint programming.

In particular for minimizing the costs, in a preferred variant of the invention, the search space is extended on optimization, in that for example . . .

several or all method standards defined for a features are taken into account.

methods or all variants of a component are taken into account. It is for example possible for an operation, and thus for costs to be saved by way of replacing a standard cam by a flex cam.

variants of the pivot position are taken into account. It is, for example, possible for features which need to be machined with the cam at the initial pivot position, to be able to be realized by from the press working direction by way of a changed pivot position, and thus the use of the cam may be eliminated.

taking into account different variants of common components. For example holes are usually grouped into groups, which are manufactured together (and then also share components such as e.g. punch retainer plates or—if necessary cams). Different groupings may on the one hand lead to a different number of groups, and on the other hand to different common components. Both may have an effect on costs.

The term "list" is to be understood in a conceptional manner, i.e. a list-like association is implemented in a computer-technical manner. This may be effected with tables or other data structures, for example in spreadsheets, databases, etc.

The invention claimed is:

1. A method for computer-aided generation of tool parameters for tools for the manufacture of sheet-metal forming parts by way of forming processes, wherein a representation of a manufacturing process is produced, which representation comprises a set of machining steps and geometric parameters of these machining steps, wherein the method comprises the following steps:

generating, using a data processing unit, a set of geometry features (11, 12, 13, 14, 15) of a part (10) in a geometry model of the part (10), wherein each of the geometry features (11, 12, 13, 14, 15) is described by way of a feature type and by way of geometric parameters for describing the geometric shape of the geometry feature (11, 12, 13, 14, 15);

generating, using a data processing unit, an associated method standard for each of the geometry features (11, 12, 13, 14, 15) by selecting a method standard from a list which associates, with each type of geometry feature, a sequence of alternate method standards, wherein a method standard is a combination of manufacturing steps that describes one variant for manufacturing the respective geometry feature (11, 12, 13, 14, 15), and the selection of the method standards which may be associated with a certain geometry feature (11, 12, 13, 14, 15) is dependent on the feature type of the geometry feature (11, 12, 13, 14, 15), and wherein a method standard comprises at least one module, and a module represents a machining unit and describes which machining unit may be executed within a forming operation;

determining components for each of the modules of the method standards, wherein these components describe the parts of tools which are required for realizing the module;

generating, using the data processing unit, component parameters from the geometric parameters of the geometry features (11, 12, 13, 14, 15), wherein the component parameters comprise geometric parameters of the components or of the respective tools; and producing, using the data processing unit, a representation of a manufacturing process including a series of said component parameters and a method standard.

2. The method according to claim 1, wherein the step of selecting a method standard from a list comprises selecting the method standard from a list which associates an ordered sequence of alternative method standards with each type of geometry feature.

3. The method according to claim 2, further comprising the following step for determining one or several associated modules, for each of the method standards:

selecting the module or modules from a list which associates a module or a sequence of modules with each method standard.

4. The method according to claim 1, further comprising the following step for determining module components, for each of the modules:

selecting one or more module components from a list which associates one or more module components with each module.

5. The method according to claim 1, further comprising the following step for determining specific component parameters from the geometric parameters of the associated geometry features:

generating component features from a table, which associates in each case component features with the geometry features (11, 12, 13, 14, 15), in dependence on the feature type, and in each case comprises a rule for generating the component parameters from the geometric parameters of the geometry feature.

6. The method according to claim 1, further comprising the step of generating a set of geometry features (11, 12, 13, 14, 15) of a part by extracting the set of geometry features automatically from the geometry model of the part.

7. The method according to claim 1, further comprising the step of:

determining a method plan, wherein a method plan comprises an ordered sequence of machining steps and further comprises the geometric parameters of these machining steps, by way of associating each of the modules with an operation, whilst taking into account constraints which limit the association in each case of a module, in dependence on the associations of other modules to respective operations.

8. The method according to claim 7, wherein the constraints are of at least one of the following group of categories:

a standard set of general rules which need to be complied with at all events;

special rules which are automatically activated on use of an associated particular method standard;

context-dependent rules, which are automatically generated by way of analysis of geometric relations between components; or manually settable rules.

9. The method according to claim 8, comprising the further steps of:

determining, for each of the components, the component costs from the component parameters, wherein the component costs represent a resource consumption for the respective component or the respective tools;

determining total costs as a sum of the component costs.

10. The method according to claim 9, further comprising the steps for determining a cost-optimal method plan by:
   determining a method plan;
   determining the component costs and determining total costs as a sum of component costs for this method plan;
   modifying parameters of the method plan and newly computing the total costs by way of an optimisation method, wherein the modifiable parameters comprise at least one of the group of:
      associating different part pivot positions with an operation;
      associating different method standards with a geometry feature (11, 12, 13, 14, 15);
      associating different variants of a component with a module;
      associating modules with operations; or
      grouping together components.

11. The method according to claim 10, wherein the following steps are implemented for determining component costs from the component parameters:
   determining a real component, whose parameters minimise a difference to a component that is specifically required, by way of searching through a table with real components and their parameters;
   computing a resource consumption per component by way of applying parameters of the real components into one or more consumption functions, and summing the results of these consumption functions, for which defined consumption functions are stored for each component;
   summing component costs over all applied components.

12. The method according to claim 11, further comprising the steps of:
   acquiring the actual resource consumption per component on manufacturing the components;
   adapting the consumption functions according to the actual resource consumption.

13. The method according to claim 1, further comprising as a first step determining at least one pivot position, in which the part (10) is to be manufactured.

14. A data processing system for the computer-aided generation of tool parameters for tools for manufacturing sheet-metal forming parts by way of forming processes, wherein the data processing system is adapted to perform the steps of:
   determining a set of geometry features (11, 12, 13, 14, 15) of a part (10) in a geometry model of the part (10), wherein each of the geometry features (11, 12, 13, 14, 15) is described by way of a feature type and by way of geometric parameters for describing the geometric shape of the geometry feature (11, 12, 13, 14, 15);
   determining an associated method standard for each of the geometry features (11, 12, 13, 14, 15) by selecting a method standard from a list which associates, with each type of geometry feature, a sequence of alternative method standards, wherein standards, wherein a method standard is a combination of manufacturing steps that describes one variant for manufacturing the respective geometry feature (11, 12, 13, 14, 15), and the selection of the method standards which may be associated with a certain geometry feature (11, 12, 13, 14, 15) is dependent on the feature type of the geometry feature (11, 12, 13, 14, 15), and wherein a method standard comprises at least one module, and a module represents a machining unit and describes which machining unit may be executed within a forming operation;
   determining components for each of the modules of the method standards, wherein these components describe the parts of tools which are required for realizing the module;
   determining component parameters from the geometric parameters of the geometry features (11, 12, 13, 14, 15), wherein the component parameters comprise geometric parameters of the components or of the respective tools; and
   producing, using the data processing unit, a representation of a manufacturing process including a series of said component parameters and a method standard.

15. A computer readable medium for computer-aided generation of tool parameters for tools for manufacturing sheet-metal forming parts by way of forming processes, which may be loaded and implemented on a data processing unit, and which when executed carries out the steps of:
   determining a set of geometry features (11, 12, 13, 14, 15) of a part (10) in a geometry model of the part (10), wherein each of the geometry features (11, 12, 13, 14, 15) is described by way of a feature type and by way of geometric parameters for for describing the geometric shape of the geometry feature (11, 12, 13, 14, 15);
   determining an associated method standard for each of the geometry features (11, 12, 13, 14, 15) by selecting a method standard from a list which associates, with each type of geometry feature, a sequence of alternative method standards, wherein a method standard is a combination of manufacturing steps that describes one variant for manufacturing the respective geometry feature (11, 12, 13, 14, 15), and the selection of the method standards which may be associated with a certain geometry feature (11, 12, 13, 14, 15) is dependent on the feature type of the geometry feature (11, 12, 13, 14, 15), and wherein a method standard comprises at least one module, and a module represents a machining unit and describes which machining unit may be executed within a forming operation;
   determining components for each of the modules of the method standards, wherein these components describe the parts of tools which are required for realizing the module;
   determining component parameters from the geometric parameters of the geometry features (11, 12, 13, 14, 15), wherein the component parameters comprise geometric parameters of the components or of the respective tools;
   producing, using the data processing unit, a representation of a manufacturing process including a series of said component parameters and a method standard.

* * * * *